(12) United States Patent
Hazari (10) Patent No.: US 9,191,814 B2
(45) Date of Patent: Nov. 17, 2015

(54) COMMUNICATIONS DEVICE AUTHENTICATION

(71) Applicant: Vodafone IP Licensing Limited, Berkshire (GB)

(72) Inventor: Gautam Hazari, Berkshire (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 81 days.

(21) Appl. No.: 13/973,079

(22) Filed: Aug. 22, 2013

(65) Prior Publication Data
US 2014/0057599 A1 Feb. 27, 2014

(30) Foreign Application Priority Data
Aug. 22, 2012 (GB) .................................. 1214961.3

(51) Int. Cl.
*H04W 88/02* (2009.01)
*H04W 12/12* (2009.01)
*H04W 12/08* (2009.01)
*H04W 12/06* (2009.01)
*H04L 29/06* (2006.01)
*H04W 88/06* (2009.01)

(52) U.S. Cl.
CPC .............. *H04W 12/06* (2013.01); *H04L 63/18* (2013.01); *H04L 63/0807* (2013.01); *H04W 88/06* (2013.01)

(58) Field of Classification Search
CPC ... H04L 63/083; H04L 67/02; H04L 63/0428; H04L 63/0853; H04L 63/20; H04L 67/42; H04L 63/12; H04L 9/3213; H04L 9/3271; H04W 12/06; H04W 12/08; H04W 48/00; H04W 84/12; G06F 21/60; G06F 21/44; G06F 21/62; G06F 21/6245; G06F 21/31
USPC ........... 455/411; 726/3, 4, 5, 9, 28, 26, 29, 30
See application file for complete search history.

(56) References Cited

U.S. PATENT DOCUMENTS 6,201,871 B1 * 3/2001 Bostley, III ........... H04L 9/0822
380/249
7,702,915 B2 4/2010 McCann et al.
(Continued)

FOREIGN PATENT DOCUMENTS

EP 1351536 10/2003

OTHER PUBLICATIONS

European Search Report dated Nov. 18, 2013 in corresponding European Application No. 13 27 5186.
(Continued)

*Primary Examiner* — Sharad Rampuria
*Assistant Examiner* — Obidon Bassinan
(74) *Attorney, Agent, or Firm* — B. Aaron Schulman, Esq.; Nicholas Trenkle, Esq.; Stites & Harbison, PLLC (57) ABSTRACT

There is described a method of accessing a resource requiring identity authentication, the method comprising: receiving at a communications device an encrypted token in response to an identity of the communications device being authenticated over a first radio access technology; decrypting the encrypted token using the identity of the communications device; and using the decrypted token over a second radio access technology to authenticate the identity of the communications device so as to allow access to the resource via the second radio access technology.

14 Claims, 9 Drawing Sheets

(56) References Cited

U.S. PATENT DOCUMENTS

| | | | |
|---|---|---|---|
| 7,873,350 B1* | 1/2011 | McDaniel | H04L 63/0281 379/112.01 |
| 2005/0210253 A1* | 9/2005 | Shigeeda | H04L 9/0863 713/171 |
| 2006/0236105 A1 | 10/2006 | Brok et al. | |
| 2007/0150735 A1* | 6/2007 | Futa | H04L 9/0844 713/171 |
| 2007/0300080 A1* | 12/2007 | Brown | H04L 9/0825 713/193 |
| 2008/0022377 A1* | 1/2008 | Chen | H04L 63/08 726/5 |
| 2008/0175386 A1* | 7/2008 | Bestermann | H04L 63/062 380/270 |
| 2009/0119754 A1* | 5/2009 | Schubert | H04L 63/0853 726/4 |
| 2011/0263223 A1* | 10/2011 | Lim | H04M 3/4234 455/411 |
| 2011/0314279 A1* | 12/2011 | Ureche | H04L 9/3228 713/167 |

OTHER PUBLICATIONS

Combined Search and Examination Report dated Dec. 18, 2012 in corresponding Great Britain Application No. GB1214961.3.

* cited by examiner

COMMUNICATIONS DEVICE AUTHENTICATION

FIELD OF THE INVENTION

The present invention relates to identifying and authenticating a communications device, and in particular relates to authenticating a communications device so as to allow access to a resource requiring identity authentication.

BACKGROUND TO THE INVENTION

Users of mobile devices, such as mobile telephones, may typically access data and services (stored, for example, on a network such as the Internet) through the cellular network to which the device is registered. This is generally permitted because, when the device communicates with the cellular network, its identity may be automatically authenticated by the cellular network. The device is thereby authorised to access the required data via the cellular network.

The situation is different, however, when a user attempts to access the data and services over a different radio access technology, e.g. by using a different network other than the user's registered cellular network, such a Wi-Fi network, for example. This is because, unlike the case where the data is accessed using the device's registered cellular network, the identity of the mobile device is generally not automatically authenticated when using Wi-Fi, for example. Thus, access to the data and services via a Wi-Fi hotspot, for instance, when identifying and authenticating the user is required, is limited or else is not possible. In order for the user to gain access to the data and services, the user must typically engage in a time-consuming and involved registration process often requiring the creation and use of a username and associated password, before the device's identity may be authenticated and access may be granted.

Furthermore, when a mobile device accesses data via a Wi-Fi network, the user's own cellular network is not provided with any notification of the mobile device being connected via the Wi-Fi network. Thus, access to data via the Wi-Fi network may be further restricted as a result, as the identity of the device cannot be ascertained by the cellular network.

The present invention seeks to address these and other drawbacks in the prior art, by providing a method and apparatus for communications device authentication.

SUMMARY OF THE INVENTION

In a first aspect of the present invention, there is provided a method of accessing a resource requiring identity authentication. The method comprises receiving at a communications device an encrypted token in response to an identity of the communications device being authenticated over a first radio access technology. The encrypted token is decrypted using the identity of the communications device, and the decrypted token is then used over a second radio access technology to authenticate the identity of the communications device so as to allow access to the resource via the second radio access technology.

The communications device may be, for example, a mobile telephone, but could be any other telecommunications device or portable device, such as a laptop computer, a desktop computer, a personal digital assistant, etc. A radio access technology may be any technology (e.g. GSM Edge RAN (GERAN), UMTS RAN (UTRAN), E-UTRAN) used for communicating with, and accessing data stored on, a telecommunications network. The token may be encrypted according to any number of various algorithms, and in one embodiment may be encrypted using the RSA algorithm.

The invention allows an identity of the device, already inherently authenticated over a first radio access technology, to be used to decrypt the encrypted token. Thus, the authenticity of the device's identity is first validated over a first radio access technology used for accessing the resource over a first network. Once the authenticity of the device's identity has been confirmed, the resource may then be accessed via a different radio access technology, for example using a different network access point. Thus, the invention advantageously allows for a more secure, seamless and efficient access to a resource, or a service, via a given radio access technology.

The method dispenses with the need to engage in an involved and complicated interaction process with a user of a mobile device, and avoids issues with requesting and validating usernames and passwords. Rather, the invention leverages the fact that the communications device's identity may be effectively 'pre-authenticated' over a first radio access technology, the same identity then being used to authenticate the device over a second, different radio access technology. The authentication process is not only more secure as a result of the encryption, but it is also more efficient as a result of the authenticated identity being used in the decryption process. Thus, rather than authenticating on the basis of authentication codes (e.g. username and/or password) that may be stolen, the method allows a communication device to be inherently authenticated on the basis of information readily accessible and verifiable over the first radio access technology. The decryption process is thereby rendered more secure and more reliable.

The encrypted token may be received at the communications device via the first radio access technology. The identity of the communications device may be authenticated over the first radio access technology in response to a communication initiated by the communications device over the first radio access technology, for example when the communications device interacts or communicates over a mobile network so as to access the desired resource or service. For example, the device may communicate with a backend server in order to access the resource via the device's mobile network. In so doing, an identity of the device, such as the device's MSISDN, or IMSI (for example), may be automatically authenticated. By receiving the encrypted token over the first radio access technology, the decryption process is rendered more seamless and more efficient, as the token may be received over the same communication channel that was used to communicate with the backend server. When attempting to access the resource via a Wi-Fi network, the device may then use the authenticated identity to decrypt the encrypted token for accessing the resource via the Wi-Fi network. Automatic identity authentication over one radio access technology, or on one network, for use in subsequent identity authentication over another radio access technology, or another network, is a more secure and a more efficient method of device authentication when compared to the prior art.

Optionally, the identity of the communications device is not automatically authenticated over the second radio access technology in response to a communication initiated by the communications device over the second radio access technology. Thus, the device may first require authentication over another radio access technology before accessing the resource via the initial radio access technology. An identity of the communications device may be an identity specific to the first radio access technology, for example a mobile telephone's number (MSISDN). Thus, such an identity is not specific to the second radio access technology. Such an identity is therefore not automatically authenticated when the device initiates a communication with this second radio access technology, such as Wi-Fi for example.

The identity of the communications device may be authenticated by a first network access point for accessing the resource via a network to which the communications device is registered. The identity of the communications device may be authenticated by a second network access point for accessing the resource via a Wi-Fi network. The device's identity may therefore be first authenticated via the mobile network. Such authentication is efficient and rapid due in part to the fact that the device is already registered with the mobile network, and thus the device's identity is generally authenticated as soon as the device initiates a communication with the mobile network. This 'pre-authentication' may then be used to reliably authenticate the device over a Wi-Fi network.

The first radio access technology may be used for accessing the resource via a secure network, and the second radio access technology may be used for accessing the resource via a non-secure network. The secure network may be the communications device's mobile network, and the non-secure network may be a Wi-Fi network. By communicating an encrypted token, as opposed to a general authorisation code (e.g. a username and/or password), over a radio access technology for accessing a non-secure network, the security of the access is increased. For an unauthorised user to wrongfully gain access to the resource, it is not enough that they obtain a copy of the encrypted token. They must furthermore obtain a copy of the device's authenticated identity in order to decrypt the token. A further layer of security is therefore provided for with present invention.

The first radio access technology may be used for accessing the resource via a cellular network, and the second radio access technology may be used for accessing the resource via a non-cellular network. For example, the first radio access technology may comprise one or more base stations used in cellular network for allowing the communications device to communicate with a mobile network. The second radio access technology may comprise a Wi-Fi hotspot.

In response to the identity of the communications device being authenticated over the first radio access technology, the method may further comprise receiving at the communications device a key generator configured to generate a unique key. A first key generated using the key generator may be transmitted from the communications device, and if the first key matches a second key generated using a stored copy of the key generator, the encrypted token may be received at the communications device. Thus, the communications device and, for example, a backend server with which it communicates may each establish whether the other is in possession of a valid key generator without the need to share the key generator. This increases the security of the authentication process.

The first and second keys, and the key generator, may be communicated via the first radio access technology. The copy of the key generator may be stored on a backend server. Therefore, when the device communicates with a backend server, the key generator may be rapidly retrieved and transmitted to the device during the authentication process.

The method may further comprise transmitting identification information from the communications device. The stored copy of the key generator may be retrieved using the transmitted identification information. The identification information may be information identifying the device, and thus the stored copy of the key generator may be associated with the device. This allows the correct copy of the key generator to be retrieved when the device requests the encrypted token. The identification information may further be uniquely associated with the key generator.

Decrypting the encrypted token may comprise transmitting from the communications device a first resource token and an ID code. The first resource token may be generated using the encrypted token, and decrypting the encrypted token may further comprise receiving at the communications device a second resource token generated using a stored copy of the encrypted token. The stored copy of the encrypted token may be retrieved using the transmitted ID code, and the method may further comprise decrypting the encrypted token if the first resource token matches the second resource token. Thus, similar to the process of acquiring the encrypted token, the communications device and, for example, a backend server with which it communicates may each establish whether the other is in possession of a valid encrypted token without the need to share the encrypted token. This increases the security of the authentication process.

The ID code may be related to the identity of the communications device, and for instance may be uniquely associated with the identity of the communications device. This allows the identity of the device to be used to decrypt the encrypted token, said identity already having been authenticated over a particular radio access technology.

The copy of the encrypted token may be stored on a backend server, and this may be the same backend server used to store the copy of the key generator. Thus, the tokens used in the authentication process may be conveniently stored in a common location, for future use.

The identity of the communications device may comprise one or more of: the MSISDN, the IMSI, and the model number. Other identification codes or numbers may be used to identify the communications device.

In a second aspect of the present invention, there is provided a communications device for accessing a resource requiring identity authentication. The communications device comprises a receiver configured to receive an encrypted token in response to an identity of the communications device being authenticated over a first radio access technology. The communications device further comprises a decrypter configured to decrypt the encrypted token using the identity of the communications device. The device further comprises a transmitter configured to use the decrypted token in a transmission over a second radio access technology to authenticate the identity of the communications device so as to allow access to the resource via the second radio access technology.

The device could be a mobile telephone, but could also be any other telecommunications device or portable device, such as a laptop computer, a desktop computer, a personal digital assistant, etc. The device may furthermore comprise additional components (e.g. one or more processors, etc.) configured to carry out any of the method steps described above. For example, the device may comprise a processor adapted to receive a key generator and transmit keys as described above.

In a third aspect of the present invention, there is provided a system for accessing a resource requiring identity authentication. The system comprises a communications device and a server (such as a backend server) configured to communicate with one another. The server is further configured to transmit to the communications device an encrypted token in response to an identity of the communications device being authenticated over a first radio access technology when the communication device initiates a communication with the server. The communications device comprises a decrypter configured to decrypt the encrypted token using the identity of the communications device. The communications device further comprises a transmitter configured to use the decrypted token in a transmission with the server over a second radio access technology, to authenticate the identity of the communications device so as to allow access to the resource via the second radio access technology.

In a fourth aspect of the present invention, there is provided a computer-readable medium comprising computer-executable instructions which, when executed on a computer, are configured to carry out the method described above. For example, the invention could reside in the memory of a mobile telephone, or could reside in software stored on a flash drive, for instance.

It will be understood by a person skilled in the art that the present invention is not limited to the specific combinations of features explicitly disclosed herein, but may also comprise any combination of features that are described independently and which the skilled person could implement together.

BRIEF DESCRIPTION OF THE DRAWINGS

The present invention may be put into practice in a number of ways and an embodiment will now be described by means of an example only, and with reference to the accompanying drawings in which.

DETAILED DESCRIPTION OF A PREFERRED EMBODIMENT

Figure 1:
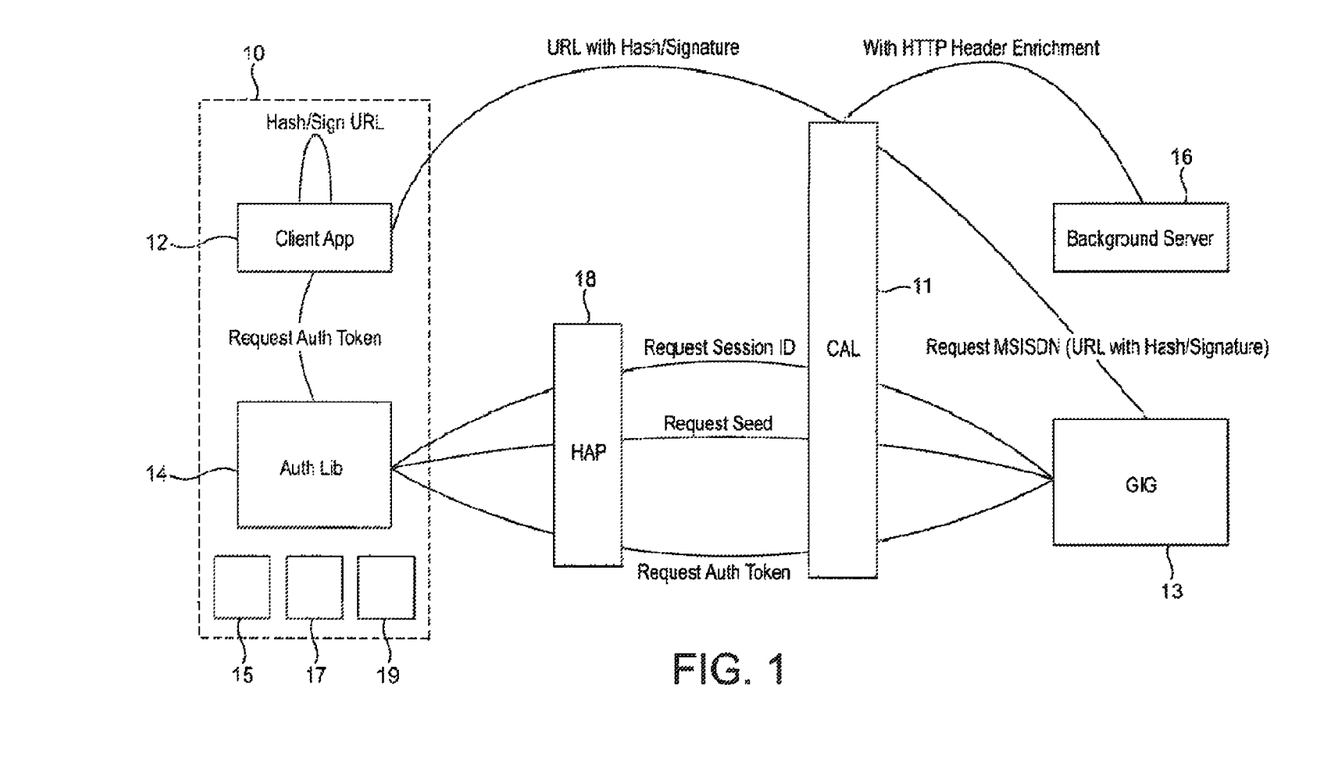
FIG. 1 is a diagram schematically illustrating the components of a system used for accessing a resource requiring identity authentication, in accordance with a preferred embodiment of the invention.

FIG. 1 illustrates an exemplary system architecture used in the authentication of a communications device over a Wi-Fi network. In accordance with this embodiment, and as illustrated in FIG. 1, there is provided a communications device 10, such as a mobile telephone, comprising a client application 12 and an authentication library 14. The device further comprises a decrypter 15, a receiver 17 and a transmitter 19. The device 10 interacts with a backend server 16 so as to authenticate an identity of the device 10 over the Wi-Fi network, or in other words over a particular radio access technology used for communicating with the Wi-Fi network.

The client application 12 is installed on the device 10 and may have wide range of different functionalities and may require different levels of resource access. The client application 12 may furthermore aggregate content from multiple network backend services and may be configured to display such content on the mobile device 10. There may be more than one client application 12 installed on the mobile device 10.

The authentication library 14 is a shared library installed on the mobile device 10. The authentication library 14 is responsible for requesting authentication on behalf of client applications. The authentication library 14 provides authentication to the client applications by authenticating tokens based on resource access types so that the client applications may make trusted and authenticated requests to the backend services, as will be explained later in greater detail. All resource requests with the appropriate validated tokens may be enriched with the appropriate user identification. The authentication library 14 is configured not to share any secret key or authentication token values with any client applications, nor within the network. Rather, the authentication library 14 provides temporary tokens (e.g. shared secrets) to the client applications and in turn to the backend services so that resource requests may be authenticated.

The system further comprises a Handset Access Proxy (HAP) 18 which is a thin proxy responsible for normalising the headers of resource requests. All resource requests over the device's mobile network, or else over Wi-Fi, are targeted to HAP 18. HAP 18 is deployed in front of the Common Access Layer (CAL) 11 and may detect whether the resource request is over the mobile network or else over Wi-Fi. HAP 18 is responsible for removing all MSISDN-related headers when the resource request is over Wi-Fi. HAP 18 is configured to pass the resource requests to CAL 11.

CAL 11 is also responsible for authorisation of the resource requests. Whilst URL pattern based authorisation is performed in CAL 11, client/user authorisation is however delegated to other services. The authentication library 14 is configured to communicate with CAL 11 using REST/JSON api. CAL 11 is configured to authorise the resource requests from the authentication library 14 and then convert the requests into appropriate SOAP messages that may be understood by GIG 13 (see below). Client applications on the mobile device 10 may also communicate with CAL 11 when accessing backend services. CAL 11 proxies the resource requests and performs an authorisation check thereon, and then enriches the request headers with the appropriate MSISDN values. The request headers may be enriched with other parameters. CAL 11 is furthermore responsible for proxying both Wi-Fi and mobile network requests. When the resource requests are proxied by CAL 11, all existing headers and cookies should remain untouched and CAL 11 should pass the values directly to the backend services.

GIG 13 is a façade of the authentication token service responsible for retaining the configuration of usage limit and duration of the authentication token based on the partner ID. GIG 13 provides a logical interface to the backend authentication token service.

The Authentication Token Service (ATS) is responsible for generating requested tokens. The verification and validation of the tokens are also done in this service.

Figure 2:
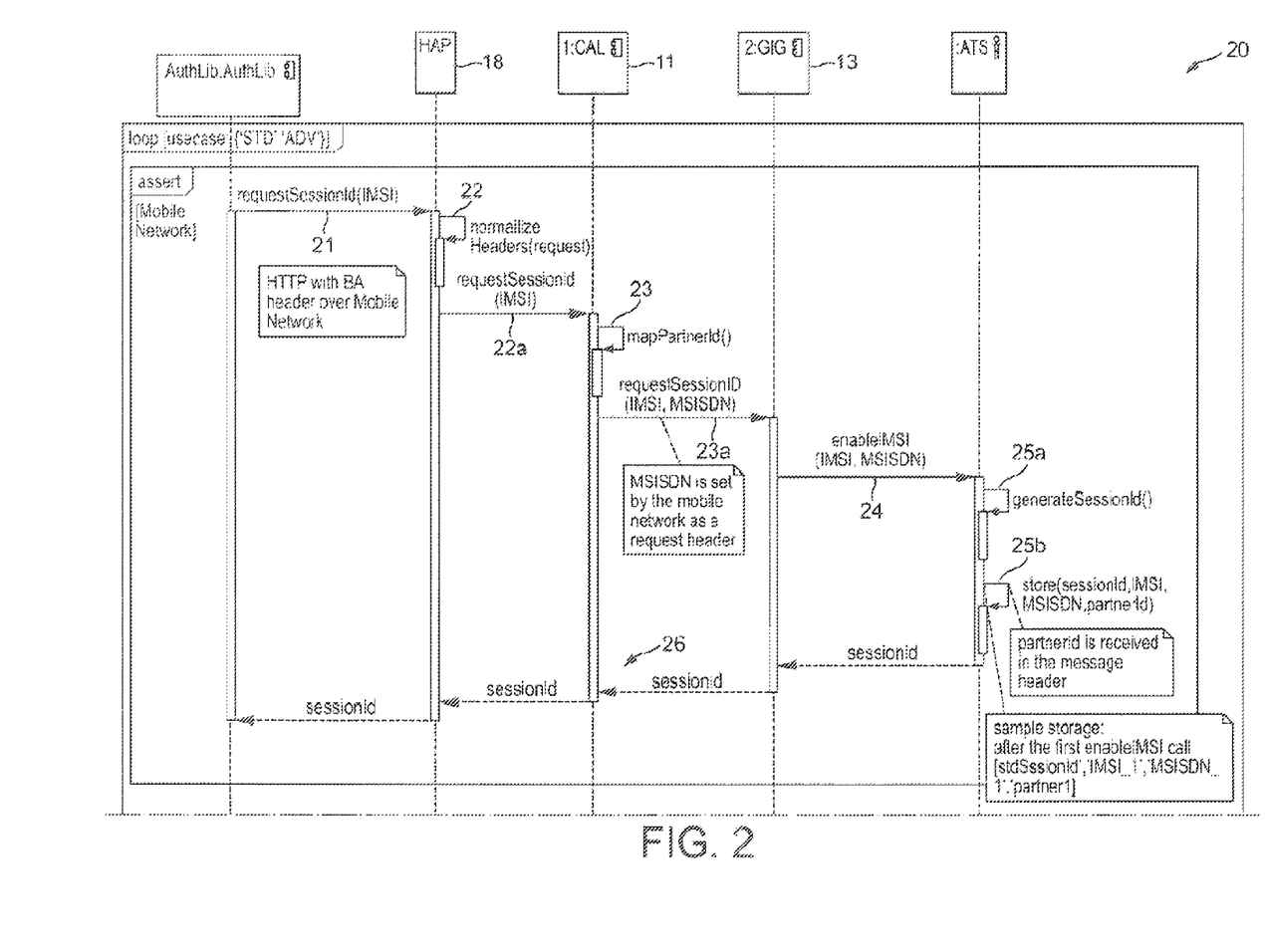
FIG. 2 is a schematic diagram illustrating the steps taken by the system of FIG. 1 to request a session ID and a seed.
Figure 3:
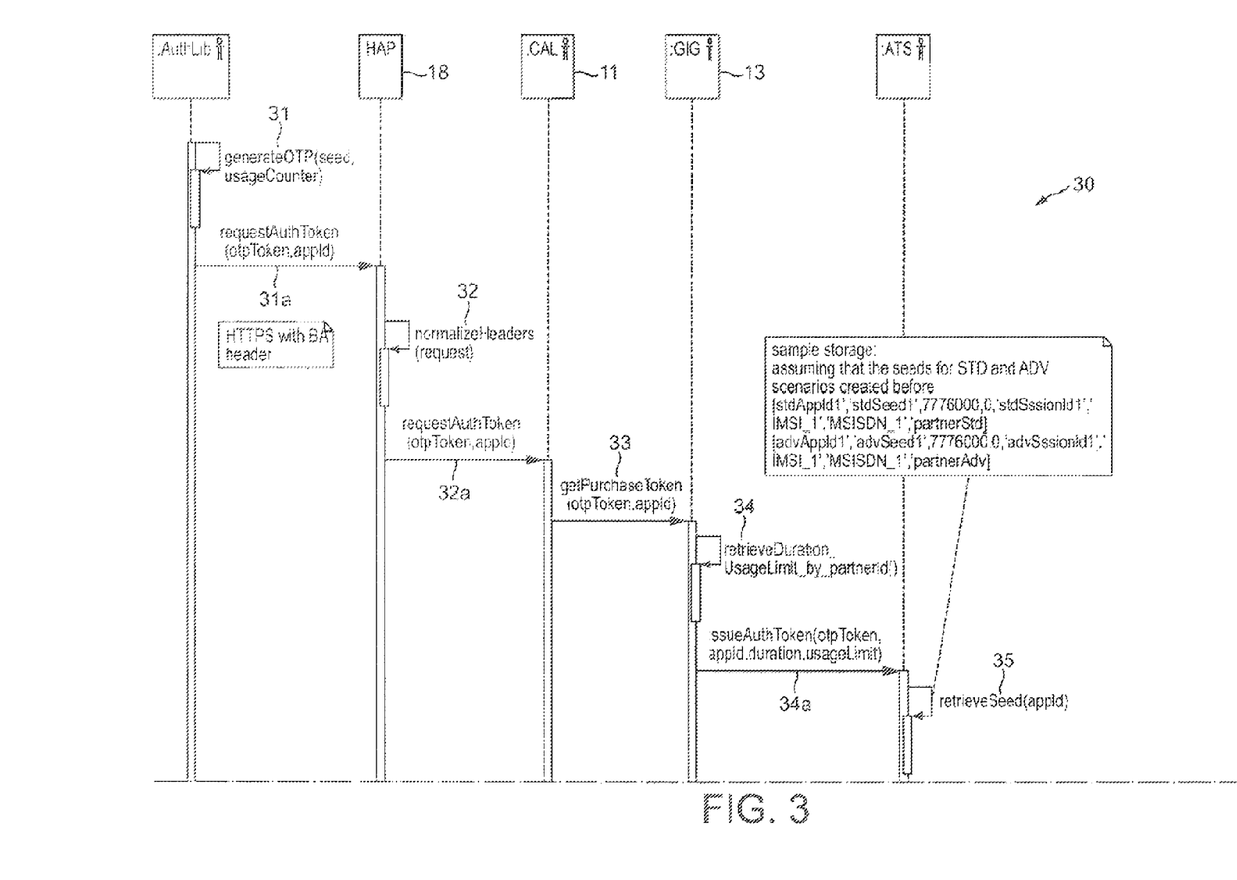
FIG. 3 is a schematic diagram illustrating the steps taken by the system of FIG. 1 to request an authentication token.
Figure 4:
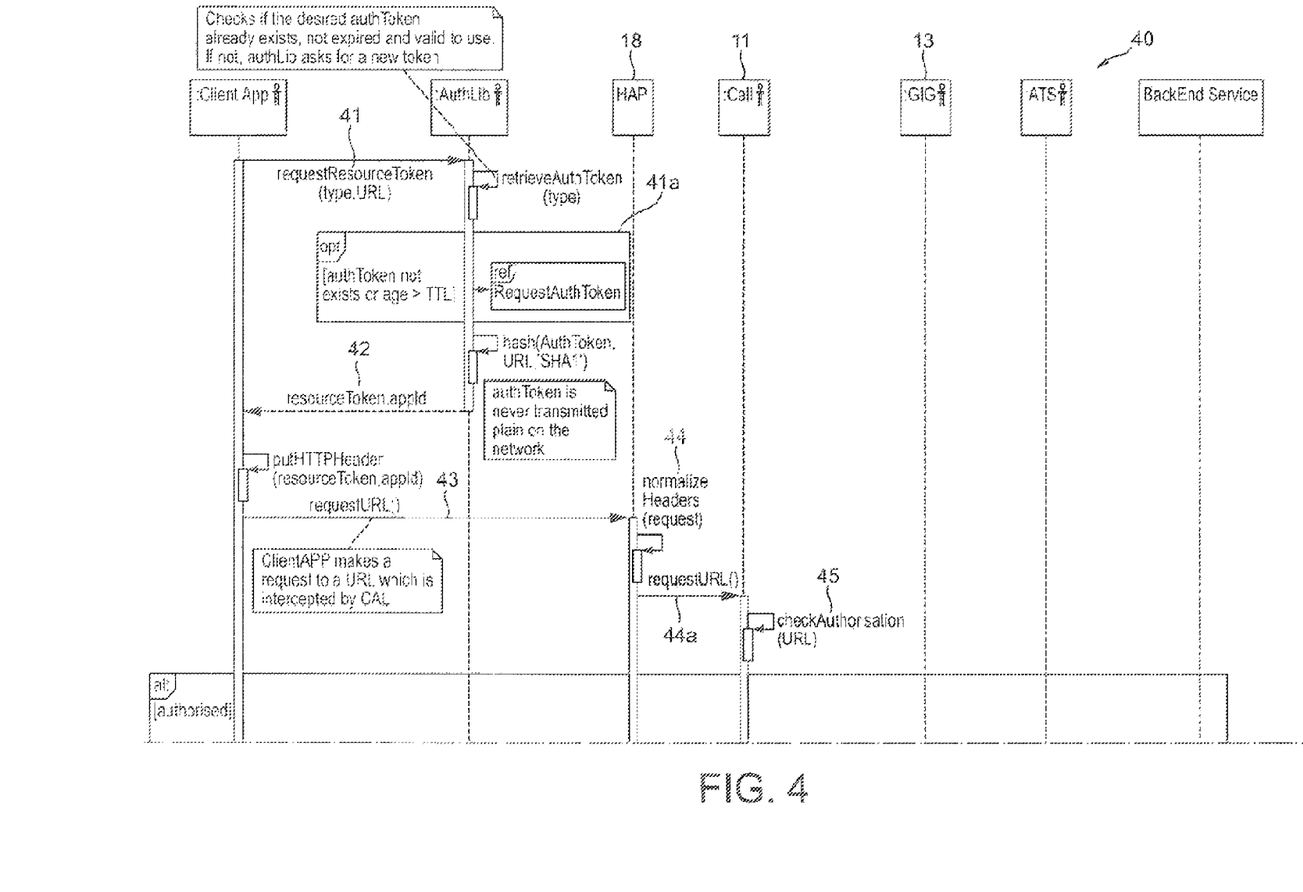
FIG. 4 is a schematic diagram illustrating the steps taken by the system of FIG. 1 to request a resource token and a resource.

FIGS. 2-4, discussed in more detail below, illustrate the steps taken by the system of FIG. 1 in accessing a resource requiring identity authentication. For a mobile device 10 to be authenticated over a particular radio access technology, such as that employed to access a Wi-Fi network, an identity of the mobile device 10, such as the device's MSISDN, is retrieved using a token authentication mechanism, which comprises the consecutive creation of tokens such as a session ID, a seed, a one time password, and authentication tokens.

In FIG. 2, there is shown, according to the present embodiment, a method 20 of requesting a session ID and a seed receiving at a mobile device 10 an encrypted token in response to an identity of the mobile device 10 being authenticated over a first radio access technology. This may be referred to as the initialisation phase.

Initialisation Phase

At step 21, the authentication library 14 requests a session ID from CAL through HAP, passing IMSI retrieved from the device (e.g. from the SIM) as well as a basic authentication header including client authentication credentials. At step 22, the mobile network adds the authenticated MSISDN as a HTTP header. HAP checks if the request is through the mobile network, in which case the MSISDN header may be retained. Because the mobile device 10 is registered to the mobile network, the identity of the mobile device 10, in this example its MSISDN, may be readily authenticated over the radio access technology used for the communication. If not, all instances of the MSISDN are removed for security purposes. The request is then forwarded to CAL at step 22a.

At step 23, CAL maps the basic authentication credentials to a partner ID. The mapping is done in CAL by mapping the basic authentication credentials with a partner ID value. At step 23a, CAL then forwards the request from CAL to GIG.

At step 24, GIG adds the partner ID, IMSI and MSISDN to the message header, and passes the request to the Authentication Token Service (ATS) in order to create a session ID.

At step 25a, ATS determines if there is a session ID previously created for the given MSISDN and partner ID. If so, then the existing session ID is invalidated. If not, then a new session ID is generated and mapped to the received parameters (IMSI, MSISDN and partner ID). At step 25b, ATS stores the session ID with the mapped values of the session ID, IMSI, MSISDN and partner ID. At step 26, the session ID is then returned to the authentication library.

At step 27, the authentication library may now make a HTTPS request with a basic authentication header in order to request a seed, together with the IMSI and the received session ID. HAP receives the request and, again, checks the headers (step 27a) and passes the request to CAL at step 27b. CAL subsequently forwards the request to GIG at step 27c. At step 27d, GIG passes the request to ATS.

At step 28a, the received session ID is validated by ATS based on its expiry settings. At step 28b, ATS then generates a unique random value for a seed (or encrypted token), and, at step 28c, another unique random value for an application ID. These values are mapped to the previously stored session ID, IMSI, MSISDN and partner ID values (step 28d). The seed, its duration and the application ID values are returned to the authentication library to CAL via GIG at step 29.

The authentication library may then store the returned values for future use.

Authentication Token Request Phase

The mobile device may then initiate a process to acquire an encrypted token, referred to herein as an authentication token. Authentication tokens may be used to authenticate the identity of the mobile device over a second, different radio access technology, so that the device may access resources over the Wi-Fi network, for instance, as opposed to the device's mobile network.

There may be multiple types of authentication tokens. In one embodiment, there may be standard and advanced authentication tokens. In GIG and ATS, the different types of authentication tokens may be differentiated by their respective partner IDs and seeds. The authentication library manages the different types of authentication tokens, depending on the type of access desired by the mobile device. For example, if the mobile device is seeking access to a resource requiring a high-level of authentication, then advanced-level authentication tokens may be required. The type of access may be defined by the client application for each request.

When requesting a seed, a standard authentication token may be provided immediately following creation of the seed. Standard authentication tokens may have longer TTL and thus they may be more likely to be used immediately after the client application launches (for instance, in order to display user-related data on a landing page when the application launches). Based on the advanced token duration configuration and the client application requirements, an advanced authentication token could also be created immediately after creation of a seed or even during seed creation. This would make sense if the authentication token could be used for only a short time of period, but more than once.

FIG. 3 illustrates the steps in a method 30 for requesting and acquiring an authentication token, in accordance with the present embodiment of the invention. At step 31, the authentication library generates a key, referred to herein as an OTP token (one time password token), using the previously stored key generator (e.g. seed). The authentication library then adds the OTP token and the application ID to the request header. At step 31a, an HTTPS request with a basic authentication header is then made to CAL through HAP, in order to request a new authentication token from ATS. At step 32, HAP receives the request, normalises the header and then passes it to CAL (step 32a). CAL then retrieves the partner ID for the request based on the partner ID mapped during the initialisation phase. The partner ID may then be added as a message header.

At step 33, GIG receives the request and, at step 34, based on the partner ID, retrieves the duration and usage limit for the token to be created. The configuration of usage limit and duration of the tokens is managed by GIG, based on the partner ID. At step 34a, the request is forwarded to ATS.

At step 35, retrieves the seed for the previously stored value of the application ID contained in the request, and ATS then creates the server-side OTP token (step 36). If, when comparing the OTP token values, the OTP tokens match, then an authentication token may be created (step 37), with the requested usage limit and duration. At step 38, a copy of the authentication token is stored and mapped to the received application ID, and the authentication token is passed back to the authentication library through CAL (step 39). The authentication library stores the authentication token. Because the authentication library may manage multiple types of authentication tokens, the authentication library can request the authentication tokens based on their usage limit and duration configurations before they expire, in order to prevent or minimise any additional latency for the client applications. Once an authentication token is obtained, the mobile device may then access the desired resource over the Wi-Fi network.

FIG. 4 illustrates the steps in a method 40 for authenticating the device over the Wi-Fi network so as to allow the device access to a desired resource. At step 41, when the client application attempts to access the Wi-Fi network, a request is made to the authentication library in order to obtain a resource token. The resource token is a hashed form of the authentication token and a URL. The authentication library checks if there is already an existing authentication token created for the type of the access desired (step 41a). For instance, if the device is seeking standard realm access, then the authentication library checks if a standard authentication token has been created and is valid. If not, then the authentication library may request a new authentication token.

The authentication library then creates a resource token by using HMAC-SHA1 algorithm with the parameters authentication token and URL, encodes it with hexadecimal (base 16), and then returns it to the client application (step 42). The client application may then insert the resource token and application ID in the request header of the URL.

At step 43, the client application then makes a request to the backend server over Wi-Fi through HAP. At step 44, HAP receives the request, checks the request header, removes all MSISDN-related headers if they exist, for security reasons, and then passes the request to CAL (step 44a). If the request URL relates to a request for access to user-specific resources, then the request may be sent over HTTPS with the appropriate header parameters as described above (resource token and application ID). If the request is an anonymous request for access, then the request may be sent over HTTP or HTTPS and the client application does not need to insert any tokens or any parameters into the request header, and no header enrichment is done in CAL for these types of requests.

At step 45, CAL makes an authorisation check based on the URL pattern and the request type. At step 45, CAL makes a getMSISDN call to GIG with the following parameters: URL, application ID, and resource token. GIG receives the getM-SISDN call and directs it to ATS (step 46). At step 47a, the previously stored copy of the authentication token is retrieved by ATS using the received application ID. After ensuring that the authentication token has not yet expired and also has not yet exceeded its usage limit, the resource token is recalculated again using the same mechanism as the one used in the client application. This recalculated hash is compared with the resource token received at ATS. If the two resource tokens match, then the MSISDN is retrieved (step 47b). The MSISDN and the hashed value of the authentication token are then returned to GIG (step 48).

At step 49a, GIG receives the MSISDN and the authentication token and returns them to CAL. The value of authentication token returned to CAL is assumed to be hashed in ATS using IMSI and SHA1. At step 49b, CAL enriches the application's HTTP request header with the MSISDN and the hashed authentication token.

In one embodiment, the backend services may publish resources with three access realms: anonymous, standard and advanced. The Anonymous Access Realm contains resources not related to any user, and does not contain any user-specific data. Only the anonymous type of access can be done through HTTP or HTTPS without requiring a resource token in the request header. No header enrichment is done for these types of requests.

The following are examples of activities that require only an anonymous level of access:
Banner images, icons for buttons
Retrieving text that contains no personal information
Static content The Standard Access Realm (STD) contains resources that are not subject to risk in terms of privacy, accounting or fraud. They can be safely accessed over HTTPS.

The following are examples of activities that require only a standard level of access:
Retrieving text that contains no personal information
Displaying user-specific recommendations The Advanced Access Realm (ADV) contains any resources that are user-specific. For these resources, the security concern overrides the concerns for performance and economy. They can safely be accessed over HTTPS.

The following are examples of activities that require an advanced level of access:
Activating a subscription
Looking up tariff, or a balance of a customer
Purchasing an item The following table shows the different properties for the three access realms:

| Access Realm | Properties |
| --- | --- |
| Anonymous | HTTP/HTTPS |
| Standard | HTTPS |
| Advanced | HTTPS |

The client certificate used in HTTPS requests may be embedded in the authentication library.

Figure 5:
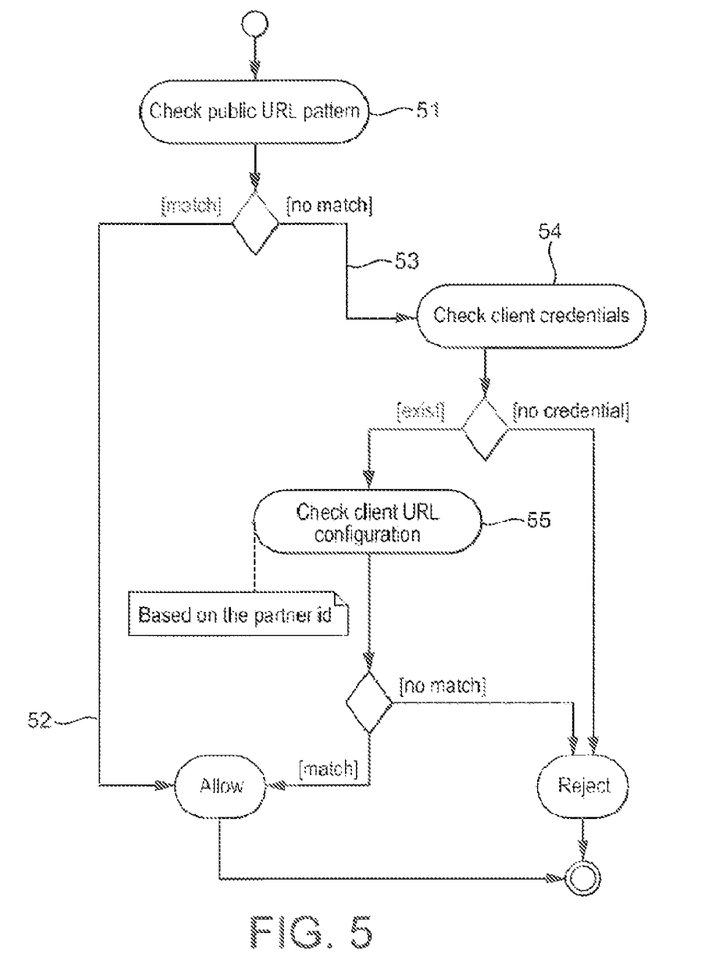
FIG. 5 is a flowchart illustrating the steps taken by CAL in the authorisation of anonymous, standard and advanced access requests.

CAL will have an authorisation based on the interactions, URL pattern configuration and client credentials if present, as illustrated in FIG. 5. CAL should have different URL pattern configurations for anonymous and standard/advance access. For anonymous access, CAL will have a public URL pattern configuration. For standard/advanced access, there should be a client URL configuration based on the partner ID. Firstly, the incoming URL is checked against the public URL pattern (step 51). If incoming URL matches the public URL pattern, then the request will be authorised (step 52). If not, CAL checks if any credentials are provided in the request (step 53). At step 54, checking client credentials includes checking the client certificate (if present) or checking the basic authentication header. If client credentials exist, then CAL checks the URL pattern against the partner ID previously mapped to the credentials (step 55). Partner ID is assumed to be configured in CAL by checking the basic authentication header in the very first call made from the authentication library during the initialisation phase in order to obtain a session ID.

CAL may also map the requests with the basic authentication header, client certificate if present, or HTTPS (server-side SSL) to a partner ID that GIG may use. CAL may obtain the initial partner ID value as a basic authentication header in the request for a session ID which is done through the mobile network and the basic authentication value is set by the authentication library. Then CAL may map the other consequent Wi-Fi HTTPS requests to the previously received partner ID by checking the basic authentication header.

In GIG, the partner ID is used to configure the usage limit and duration for the requested authentication tokens. The partner ID used to create standard authentication tokens may have different usage limit and duration settings than the partner ID used to create advanced authentication tokens.

During the authentication process over Wi-Fi, there may be multiple tokens used and shared between the mobile device and ATS. In the present embodiment, there are six different access tokens used for authentication and identification purposes: seed (or key generator), application ID, OTP token (or key), resource token, and authentication token (standard and advanced).

OTP tokens and resource tokens are used for validating seeds and authentication tokens, respectively, without having to transfer their secret values across the network. Therefore, these tokens tend to have a very short lifetime; they may be generated every time the validation occurs and are generally discarded after use.

Figure 6:
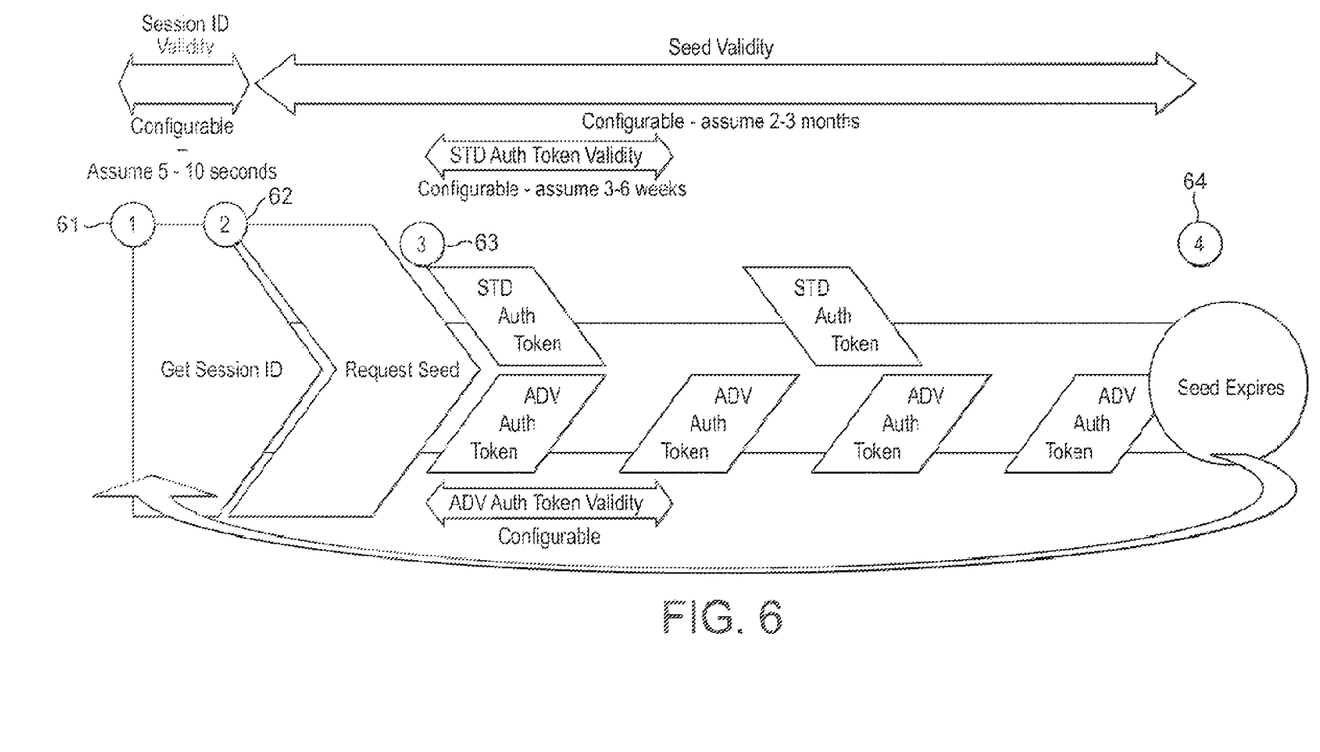
FIG. 6 is a schematic diagram illustrating the lifespans for each of six different tokens used in a preferred embodiment of the present invention.

FIG. 6 illustrates the typical lifetime of each of the above tokens. Of course, the lifetime of each token may be varied depending on, for example, the type of resources being requested, the security of the network over which they are being requested, the degree of authentication desired, etc. At step 61, a session ID is created. At step 62, a seed for the session is obtained. At step 63, an authentication token is created. This event may repeat multiple times as long as the seed is valid, as the validity period of the authentication token may be shorter than that of the seed. In step 64, the seed reaches the end of its validity period and expires. A new session ID and seed are thus required.

Session ID

The session ID serves to obtain a seed token (key generator). The session ID is obtained using a call to the GetSessionID operation on the ATS. The operation to ATS requires a partner ID, IMSI and MSISDN. A session ID is returned. The authentication library may access the GetSessionID operation through the JSON-XML Proxy (CAL) over the mobile network. The mobile network ensures that the communication is secure and provides the MSISDN for the device in the X-SDP-MSISDN header. The session may be requested with the POST method indicating that a session is to be created. The IMSI may be explicitly provided together with the basic authentication header. The request is HTTP containing the basic authentication credentials. Even though the request is HTTP, it is secure as it will be coming through the mobile network. CAL is responsible for introducing the partner ID based on the basic authentication credentials and the MSISDN taken from the X-SDP-MSISDN header. Extracting the partner ID value from the basic authentication credentials occurs in the setup phase. Then the partner ID will be put into ATS request header and, in ATS, a session ID is generated and then IMSI, MSISDN and partner ID are stored as being associated with that session ID.

The session ID may be short-lived, and although its lifetime is configurable it is likely to be less than ten seconds. Once the session ID has expired it cannot be reused, and, once expired, attempting to use it to obtain a seed will result in an error. If a request for a seed fails because the session ID has expired, then the authentication library should obtain another session ID and try again. The client should not attempt to retry more than three consecutive times. After these retries the client should fail with an error to the user.

Seed

| Token | Example |
|---|---|
| Seed | e2a0decdc1a2b427d73999e65efa026ded626c4e |

The seed, also known as a key generator, is used to create an OTP token (or key) which is used to obtain a desired type of authentication token. The fact that authentication library holds a valid seed validates the authenticity of the device. An example seed is indicated above. The seed is treated as a shared secret, which means that it is not included in any requests from the mobile device. Instead, it is used to generate an OTP token. Both the ATS and authentication library may store a usage counter associated to the seed. The usage counter is increased with each use and used when creating the OTP token to generate a unique token for each request. For each authentication library instance, there may be multiple seeds created, for example one for requesting standard authentication tokens and another other for requesting advanced authentication tokens.

The seed is obtained using a call to the RequestSeed operation on the ATS. This operation requires a session ID and an IMSI. A seed, application ID and duration are returned. The authentication library may only access the RequestSeed operation through CAL. Although the call may be made over Wi-Fi, the short lifespan of the session ID means that the call will generally be made over the mobile network. The seed may have the longest lifespan of all the tokens. The exact time is configurable, but is likely to be few months, such as three months. The duration field returned by the RequestSeed operation may provide the exact time to live in seconds. Once a seed has expired it cannot be reused, and attempting to use an expired seed to obtain an authentication token will result in an error. A seed can expire because it has reached the end of its duration or because a replacement seed has been created. The authentication library is provided with the exact duration of the token and should use this knowledge to request a new seed close to expiry.

Application ID

| Token | Example |
|---|---|
| Application ID | 038d97b448ec640d7bfd8f438e0d9f35a883196d |

The application ID is used in conjunction with the OTP token when requesting an authentication token. An example application ID is indicated above. When a seed is requested, the ATS stores the seed associated with application ID. The application ID is unique per authentication library instance. It identifies every other authentication library installed in different devices. The application ID is used as a lookup key in ATS. It is associated with a seed and the authentication tokens generated for every request. The application ID is then used by ATS so that the seed can be retrieved for validating the OTP token. There is one application ID associated with any given seed. The application ID is valid as long as the corresponding seed is valid. The application ID expires with the corresponding seed.

OTP Token

| Token | Example |
|---|---|
| OTP Token | 64661784 |

The OTP token is a One Time Pass token used to obtain an authentication token. An example OTP token is indicated above. The use of an OTP token allows the ATS to confirm that the authentication library is in possession of the seed without the need to share the seed. The client generates the OTP token based on the seed and includes it in a call together with the application ID to retrieve an authentication token. The ATS uses the application ID to retrieve its stored copy of the seed and generate its own corresponding OTP token. If the two values of the OTP token do not match the request is rejected. If the two values of the OTP token do match, the request is granted and an authentication token may be provided to the client. The use of the OTP token is based on the HOTP standard (http://www.ietf.org/rfc/rfc4226.txt) (RFC 4226), standardized by OATH (http://www.openauthentication.org/).

The OTP token is generated by both the authentication library and the Authenticated Token Service based on the seed (and usage counter if there is one). The OTP token may be generated using the algorithm set out in section 5 of the HOTP standard using the seed as the shared secret (K) and the usage counter as the moving factor (C). The OTP token has one use. After each use, the usage counter is increased leading to a new OTP token value. Once used, an OTP token has expired and cannot be reused. Any attempt to reuse an expired OTP token will result in an error.

Authentication Token

| Token | Example |
|---|---|
| Authentication Token | 379209b61fba6482acbc5a2d8ffcc36ae2fc5556 |

Authentication tokens are used to authorise access to the resource. An example authentication token is indicated above. The fact that the authentication library holds valid authentication tokens validates the authenticity of the mobile device making the requests. The authentication tokens are treated as shared secrets, which means that their values are not included in any requests from the device. Instead, they are used to generate resource tokens.

The authentication token is obtained using a call to a GetPurchaseToken operation on the ATS. The operation requires an application ID and OTP token, and returns an authentication token, and may also return a usage limit and duration. The authentication library may access the GetPurchaseToken operation through the JSON-XML Proxy (CAL). The call may be made over either Wi-Fi or the mobile network using HTTP or HTTPs. When making the request, only the OTP token is explicitly provided. The application ID may be included in the authorisation header. The authentication token is generally short-lived but has a configurable lifespan. If a duration field is returned by the GetPurchaseToken operation, then the exact time to live may be provided in seconds. Once an authentication token has expired, it cannot be reused and attempting to use it to obtain a resource will result in an error. An authentication token may expire because it has reached the end of its duration or because a replacement authentication token has been generated. The authentication library is provided with the exact duration of the token and should use this knowledge to request a new authentication token close to expiry.

Resource Token

| Token | Example |
|---|---|
| resource token | 64661784 |

A resource token is used to gain access to a specific resource, as identified by an absolute URL excluding the query parameters. It is also referred to as hash generated using an appropriate type of authentication token, URL and SHA-1 algorithm. The use of the resource token allows the ATS to confirm that authentication library is in possession of a valid authentication token without the need to share authentication token. An exemplary resource token is illustrated above.

When the client application needs access to the backend services, then a request is made to the authentication library to acquire a resource token based on the requested URL. The authentication library generates the resource token based on the URL and authentication token, and returns the resource token back to the client application. The client application may then include it in the header of a request. The request is authorised in CAL based upon the request type (HTTP or HTTPS), client certificate or basic authentication header if any of them exist, and the URL pattern configuration in CAL.

CAL may then call a GetMSISDN operation of ATS with the following parameters: resource token and application ID. In ATS, the locally stored authentication token is retrieved by using the associated application ID. Then the ATS version of resource token is compared to the client version of the resource token, and if the two versions of the resource token do not match, then the request is rejected. If they do match, then access to the resource may be granted.

The resource token is generated by both the authentication library and the ATS based on the seed and the URI (absolute path). The resource token is generated by using the authentication token as a secret parameter and the URI as the key parameter in the HMAC-SHA-1 algorithm, and the result is encoded using hexadecimal encoding. The mechanism could be formulised as below.

resource token=BASE16(HMAC_SHA1(authentication token,uri.path))
Example :
URI = https://hap-dit.sp.vodafone.com/cal/vfmmc/music/purchase/MusicStore.rcsa?foo=bbb
URI.path = /cal/vfmmc/music/purchase/MusicStore.rcsa
resource token=BASE16(HMAC_SHA1("authentication token123"," /cal/vfmmc/music/purchase/MusicStore.rcsa"));

The resource token is valid as long as the corresponding authentication token is valid. The resource token expires with the corresponding authentication token.

Many combinations, modifications, or alterations to the features of the above embodiments will be readily apparent to a person skilled in the art, and are intended to form part of the invention. For example, the IMSI of the communications device, as opposed to its MSISDN, could be authenticated over the mobile and Wi-Fi networks, or in more general terms over the first and second radio access technologies.

The invention claimed is:

1. A method of accessing a resource requiring identity authentication, the method comprising:
   receiving at a communications device an encrypted token in response to an identity of the communications device being authenticated over a first radio access technology;
   decrypting the encrypted token using the identity of the communications device; and
   using the decrypted token over a second radio access technology to authenticate the identity of the communications device so as to allow access to the resource via the second radio access technology,
   wherein the identity of the communications device is not automatically authenticated over the second radio access technology in response to a communication initiated by the communications device over the second radio access technology.

2. The method of claim 1, wherein the encrypted token is received at the communications device via the first radio access technology.

3. The method of claim 1, wherein the identity of the communications device is authenticated over the first radio access technology in response to a communication initiated by the communications device over the first radio access technology.

4. The method of claim 1, wherein the identity of the communications device is authenticated by a first network access point for accessing the resource via a network to which the communications device is registered, and wherein the identity of the communications device is authenticated by a second network access point for accessing the resource via a Wi-Fi network.

5. The method of claim 1, wherein the first radio access technology is used for accessing the resource via a secure network, and wherein the second radio access technology is used for accessing the resource via a non-secure network.

6. The method of claim 1, wherein, in response to the identity of the communications device being authenticated over the first radio access technology, the method further comprises:
   receiving at the communications device a key generator configured to generate a unique key;
   transmitting from the communications device a first key generated using the key generator; and
   receiving at the communications device the encrypted token if the first key matches a second key generated using a stored copy of the key generator.

7. The method of claim 6, wherein the first and second keys, and the key generator, are communicated via the first radio access technology.

8. The method of claim 6, wherein the copy of the key generator is stored on a backend server.

9. The method of claim 6, further comprising transmitting identification information from the communications device, and wherein the stored copy of the key generator is retrieved using the transmitted identification information.

10. The method of claim 1, wherein decrypting the encrypted token comprises:
    transmitting from the communications device a first resource token and an ID code, wherein the first resource token is generated using the encrypted token;
    receiving at the communications device a second resource token generated using a stored copy of the encrypted token, wherein the stored copy of the encrypted token is retrieved using the transmitted ID code; and
    decrypting the encrypted token if the first resource token matches the second resource token.

11. The method of claim 10, wherein the copy of the encrypted token is stored on a backend server.

12. The method of claim 1, wherein the identity of the communications device comprises one or more of: the MSISDN, the IMSI, and the model number.

13. A communications device for accessing a resource requiring identity authentication, comprising:
    a receiver configured to receive an encrypted token in response to an identity of the communications device being authenticated over a first radio access technology;
    a decrypter configured to decrypt the encrypted token using the identity of the communications device; and
    transmitter configured to use the decrypted token in a transmission over a second radio access technology to authenticate the identity of the communications device so as to allow access to a resource via the second radio access technology,
    wherein the identity of the communications device is not automatically authenticated over the second radio access technology in response to a communication initiated by the communications device over the second radio access technology.

14. A non-transitory computer-readable storage medium comprising computer-executable instructions stored thereon which, when executed on a computer, are configured to carry out the method of claim 1.

* * * * *